United States Patent [19]
Uetsuki et al.

[11] Patent Number: 5,296,965
[45] Date of Patent: Mar. 22, 1994

[54] REFLECTION-TYPE SCREEN

[75] Inventors: Masao Uetsuki, Tokyo; Satoshi Hirofuji, Kurashiki; Yasuhira Takeuchi, Fuwa, all of Japan

[73] Assignee: Kuraray Co., Ltd., Kurashiki, Japan

[21] Appl. No.: 2,819

[22] Filed: Jan. 11, 1993

[30] Foreign Application Priority Data

Jan. 10, 1992 [JP] Japan .................................. 4-21787
Jan. 23, 1992 [JP] Japan .................................. 4-34332

[51] Int. Cl.$^5$ ............................................. G03B 21/60
[52] U.S. Cl. .......................................... 359/459; 359/63
[58] Field of Search ................ 359/63, 443, 460, 452, 359/453, 459

[56] References Cited

U.S. PATENT DOCUMENTS 3,248,165  4/1966  Marks et al. .
4,592,623  6/1986  Yamamoto et al. ................ 350/397
4,888,343  11/1989 Teshirogi ............................ 350/338
5,148,309  9/1992  Yamada ................................ 359/443

FOREIGN PATENT DOCUMENTS

0295913  12/1988  European Pat. Off. .
57-163225  10/1982  Japan .

Primary Examiner—Richard A. Wintercorn
Attorney, Agent, or Firm—Oblon, Spivak, McClelland, Maier & Neustadt

[57] ABSTRACT

A screen of reflection-type operable with linearly polarized imagewise rays of light projected thereon for presenting a projected image, carried by the linearly polarized imagewise rays of light (8), to viewers occupying a position in front of the screen. The screen comprises a polarizing film (6) having first and second surfaces, a metal layer (4) formed on the second surface of the polarizing film (6) for reflecting the linearly polarized imagewise rays of light (8), and an indentation structure formed on both of the metal layer (4) and the polarizing film (6) for reflecting the imagewise rays of light (8) uniformly at a desired angle of reflection. The linearly polarized imagewise rays of light (8) enter the polarizing film (6) through the first surface thereof while the linearly polarized rays of light (8) have a plane of vibration of an electric field or a magnetic field in a direction required to exhibit a maximum light transmissivity. The screen may also be operable with a bundle of imagewise rays of light (8) projected from a projector (1) in the form of a cone of light as spherical waves onto the screen or a bundle of imagewise rays of light (8) projected from a projector as plane or approximately plane waves onto the screen.

10 Claims, 8 Drawing Sheets

REFLECTION-TYPE SCREEN

BACKGROUND OF THE INVENTION

1. Field of the Invention

The present invention generally relates to a projection screen of a reflection type for displaying a picture by means of a linearly polarized light and, more particularly, to the projection screen suited for use with a liquid crystal display device.

2. Description of the Prior Art

As compared with the display device utilizing a cathode ray tube, the liquid crystal display device has many advantages: compact in size, light-weight and less harmful to the environments when disposed of. Therefore, the liquid crystal display is now in widespread use. However, the liquid crystal display device has a problem in providing a sufficient brightness when imagewise ray of light descriptive of a series of pictures reproduced by the liquid crystal display device are projected onto the large-size screen. Therefore, viewers are generally required to look at the screen in a dark room in which entry of external light from the outside is minimized.

In view of the finding that, while rays of light projected from the liquid crystal display device are linearly polarized, external rays of light that constitute a cause of reduction in brightness of the image projected on the screen are generally non-polarized, the image projected onto the screen under bright environments can be reasonably viewed if the screen is so designed as to eliminate a reflection of the external rays of light impinging thereon from the screen. By way of example, Japanese Laid-open Patent Publications No. 62-266980 and No. 64-77085, published in 1987 and 1989, respectively, disclose the use of a light absorbing polarizing filter on one surface of the screen to minimize the amount of reflection of the non-polarized external rays of light from the screen surface.

Also, Japanese Laid-open Patent Publication No. 2-267536 published in 1990 discloses an image projection system wherein a source of light such as a house room illuminator is covered up with the use of a light-absorbable polarizing filter having a direction of polarization oriented perpendicular to the direction of polarization of the polarizing filter on the screen.

It has, however, been that, in order to enhance the contrast or visibility of the linearly polarized image projected onto the screen under bright environments, a mere elimination or minimization of the non-polarized external rays of light is not sufficient, and the following problems which will now be discussed in detail with reference to FIG. 15 have to be eliminated.

Figure 15:
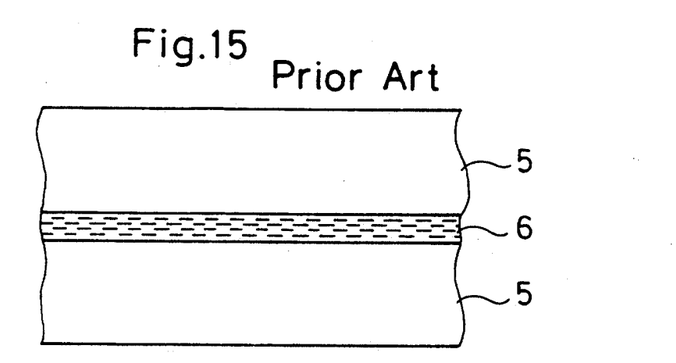
FIG. 15 is a fragmentary sectional view of the prior art polarizing filter of light absorbing type.

As shown in FIG. 15, the prior art light-absorbable polarizing filter comprises a polarizing sheet 6 sandwiched between protective films of triacetyl cellulose (TAC) generally identified by 5. The polarizing sheet 6 used therein is in the form of a stretched film of poly(vinyl alcohol) (PVA) in which polarization developing substances are dispersed. This prior art light-absorbable polarizing filter has the following problems.

(a) Due to process limitations generally encountered in the process of stretching the PVA film, the polarizing filter that can be manufactured has a width generally limited to 50 to 100 cm and, where this polarizing filter is desired to be used for a screen of a size larger than the polarizing filter, a number of the polarizing filters must be joined together to provide a surface area corresponding to the desired screen size. The fact that the plural polarizing filters are joined together involves the presence of joints at which the polarizing filters are joined, and these joints tend to constitute a cause of reduction in quality of the image eventually projected on the resultant screen.

(b) The PVA film used in the prior art polarizing filter has a film thickness of about 20 $\mu$m and is therefore very pliable. On the other hand, the TAC film that is applied on each of the opposite surfaces of the PVA film for the protection of the polarizing sheet has a film thickness of about 80 $\mu$m and is therefore relatively rigid. Accordingly, the screen comprising the polarizing sheet sandwiched between the protective films lacks a flexibility generally required in the screen, involving a difficulty in bending and capability of being embossed.

(c) Since the polarizing sheet is flat in shape, disposition of the polarizing sheet in the screen tends to result in an increased local reflection of an image of the aperture of the liquid crystal display device to such an extent as to reduce the quality of the image projected on the screen considerably.

(d) While iodine is generally used as a polarization developing substance to be employed in the polarizing filter capable of exhibiting a high polarizability (99.9% or higher polarizability), the polarizing sheet using iodine has a low resistance to heat and also to humidity and is, therefore, susceptible to reduction in polarizability and transmissivity of polarized light.

It is generally well known that the liquid crystal display device is unable to make a maximized utilization of the light produced by a light source partly because a video signal applied to the liquid crystal display device is reproduced with the use of a polarizing filter of light absorbing type and partly because the aperture of the optical system thereof is small due to thin-film transistors disturbing a transmission of signal light therethrough. Accordingly, the screen used to project the imagewise rays of light emitted through the liquid crystal display device is required to have as high a reflectivity as possible and, therefore, this requirement brings about the following problem.

(e) If oxygen pass through material covering a surface of a reflector sheet, a metallic layer forming a part of the reflector tends to be oxidized in contact with air, resulting in an eventual reduction in reflectivity exhibited by the reflector sheet.

Particularly in the case of a large-size screen, the screen is generally folded or rolled up for storage when it is not in use. Therefore, this brings about the following problem.

(f) A finely indented structure employed in the reflector sheet for optimization of the angle of reflection of rays of light projected onto the reflector sheet is susceptible to damages when the screen is repeatedly folded or rolled up each time the screen is to be stored.

SUMMARY OF THE INVENTION

The present invention is therefore to provide an improved screen of reflection type less susceptible to reduction in image quality which would otherwise occur under the influence of an increased local reflection of the rays of light projected onto the screen, while substantially eliminating or minimizing the problems (a) to (f) discussed hereinabove in connection with the prior art screen.

To this end, according to one aspect of the present invention, there is provided a screen of reflection-type operable with linearly polarized imagewise rays of light projected thereon for presenting a projected image, carried by the linearly polarized imagewise rays of light, to viewers occupying a position in front of the screen. This screen comprises a polarizing film having first and second surfaces, a metal layer formed on the second surface of the polarizing film for reflecting the linearly polarized imagewise rays of light, and an indentation structure formed on both of the metal layer and the polarizing film for reflecting the imagewise rays of light uniformly at a desired angle of reflection thereby substantially eliminating an increased local reflection. The linearly polarized imagewise rays of light are incident upon the first surface thereof while linearly polarized imagewise rays of light have a plane of vibration of an electric field or a magnetic field in a direction required to exhibit a maximum light transmissivity through the polarizing film.

As discussed in connection with the problem (c), when the flat plate polarizing filter is fitted to the screen, an image of the aperture of the liquid crystal display device is locally reflected considerably from a surface thereof and, consequently, the image projected onto the screen cannot be viewed clearly. This problem can advantageously be eliminated when, after the formation of the metal layer for reflecting the projected rays of light on a rear surface of the polarizing film, both of the metal layer and the polarizing film are embossed to provide the indentation structure for the adjustment of the angle of reflection (the viewing angle) thereby to render the surface of the polarizing film to be non-flat. The prior art polarizing filter can hardly be applied to a large-size screen because of the process limitation imposed during a stretching process of the poly(vinyl alcohol) (PVA) film as discussed in connection with the problem (a) and is also difficult to emboss while lacking a flexibility or bendability since the rigid TAC film is used as a protective layer as discussed in connection with the problem (b). These problems originate from the polarizing film made of poly(vinyl alcohol), which is hydrophilic, and an iodine compound susceptible to modification under the influence of elevated temperatures and humidity. In view of this, the use of a thermoplastic polymer such as, for example, poly(ethylene-co-vinyl alcohol) (EVOH) in place of PVA and also of the dichroic organic dye in place of the iodine permits the formation of a stretched film having an increased width and also the ease to emboss at elevated temperatures and, at the same time, permits the formation of the protective layer with the use of a thin, flexible transparent resinous layer having a thickness far smaller than the TAC film because the resultant polarizing film itself has inherently a high resistance to humidity.

As discussed in connection with the problem (d), both of the polarizability and the transmissivity of the polarizing film prepared by the use of the iodine as a polarization developing substance tends to be lowered under the influence of ambient temperatures and ambient humidity during the manufacture thereof and also during the use thereof. However, according to the present invention, this problem can be substantially eliminated when the dichroic organic dye having a high heat resistance and a high humidity resistance is employed in place of the iodine compound.

The problem associated with the reduction in reflectivity of the metal layer forming the reflector, which is attributable to an oxidization of the metal layer in contact with air, as discussed in connection with the problem (e), can be advantageously eliminated when the use is made of an oxygen-impermeable polymer such as, for example, poly(ethylene-co-vinyl alcohol) (EVOH) for forming the polarizing film and/or the use is made of the protective layer for covering the polarizing film.

Where a transparent resin layer as a protective layer is employed over the polarizing film for minimizing or substantially avoiding damages to the polarizing film, this problem can be solved either if the surface of the polarizing film is covered by a thermoplastic protective layer made of transparent resin or the surface of the polarizing film is covered by transparent resin along the indentation structure formed on the polarizing film so as to form a thin layer over the surface of the polarizing film subsequent to the embossing process.

The problem that, as discussed in connection with the problem (f), the finely indentation structure employed in the reflector sheet for optimization of the angle of reflection of rays of light projected onto the reflector sheet is susceptible to damages when the screen is repeatedly folded or rolled up each time the screen is to be stored, can be advantageously eliminated if, after the formation of the metal layer on a thermoplastic polymer sheet such as, for example, poly(ethylene terephthalate) (PET) by the use of a vapor-deposition technique or a chemical plating technique, a multi-layered structure is formed with the polarizing film and the protective layer, followed by an embossing of the multi-layered structure to form the indentation structure.

As discussed hereinbefore, in order for viewers to look a clear image projected from the liquid crystal display device onto the screen, it is important to make the screen equipped with a structure effective to reflect the projected imagewise rays of light uniformly within the angle of reflection (the viewing angle) required to accomplish the purpose.

To this end, according to another aspect of the present invention, there is also provided a screen adapted to be disposed with a surface thereof oriented perpendicular to a center axis of a bundle of imagewise rays of light projected from a projector in the form of a cone of light as spherical waves onto the screen for presentation of an image carried by the imagewise rays of light. This screen includes a reflecting surface of a shape defined by specific equations.

Furthermore, according to a further aspect of the present invention, there is provided a screen adapted to be disposed with a surface thereof oriented perpendicular to a center axis of a bundle of imagewise rays of light projected from a projector as plane or generally plane waves onto the screen for presentation of an image carried by the imagewise rays of light, said screen having a reflecting surface, a unitary structure of a periodic cross-sectional shape of said reflecting surface being defined by other specific equations.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

EXAMPLE 1

After a transparent film made of poly(ethylene-co-vinyl alcohol) (EVOH) containing 32 mol % of ethylene component and 68 mol % of vinyl alcohol component has been stretched in a lengthwise direction thereof to a length which is about four times the original length thereof, the stretched film web was immersed for 30 minutes at 50° C. to dye in an aqueous solution containing 0.3 wt % of dichroic organic dyes dissolved therein to provide a thermoplastic, oxygen-impermeable polarizing film 6 of 25 $\mu$m in thickness and 150 cm in width. The dichroic organic dyes had a neutral gray color and were a mixture of a commercially available red polarizing dye manufactured and sold under a tradename, "Dialuminous Red 4B", from Mitsubishi Kasei Co., Ltd. of Japan, a commercially available green polarizing dye manufactured and sold under a tradename, "Direct Dark Green BA", from Sumitomo Kagaku Kogyo Co., Ltd. of Japan, and a commercially available blue polarizing dye manufactured and sold under a tradename, "Direct Sky Blue 6B", from Mitsubishi Kasei K.K.

A polyethylene (PE) film of 25 $\mu$m in thickness was then bonded as a protective film 5 to each of opposite surfaces of the polarizing film 6, prepared in the manner described above, by the use of a commercially available bonding agent manufactured and sold under a tradename, "A-385/A-50", from Takeda Yakuhin Kogyo Co., Ltd. of Japan, thereby completing the polarizing sheet.

On the other hand, a light reflecting sheet was prepared by vapor-depositing an aluminum layer 4 of 1,000 Å on one surface of a poly(ethylene terephthalate) (PET) sheet 3, as an example of a thermoplastic resin sheet, of 25 $\mu$m in thickness and 150 cm in width.

Figure 2:
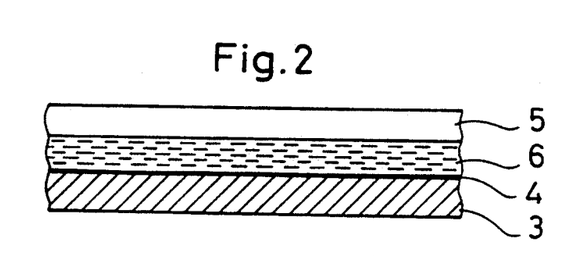
FIG. 2 is a schematic sectional view of a polarizing and reflecting sheet employed in the practice of the present invention.

The polarizing sheet referred to above was subsequently bonded to a metallic surface of the light reflecting sheet by the use of a commercially available bonding agent manufactured and sold under a tradename, "A-385/A-50", from Takeda Yakuhin Kogyo Co., Ltd., thereby completing a light reflective polarizing sheet of a structure shown in FIG. 2.

Figure 1:
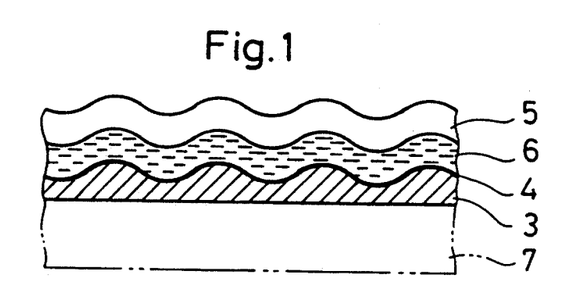
FIG. 1 is a schematic sectional view of screen material according to a first preferred embodiment of the present invention.

This light reflective polarizing sheet was subsequently subjected to an embossing process to transcribe surface irregularities or indentations thereto for the purpose of adjusting the angle of reflection (viewing angle) of the imagewise rays of light to be projected onto the light reflective polarizing sheet, thereby to provide a screen material of a structure shown in FIG. 1. The indentations are, for example, in the shape of a sine curve having a wave height of 1 to 50 $\mu$m and a pitch of 10 to 200 $\mu$m while a wavelength of the imagewise rays of light to be projected is smaller than 10 $\mu$m and the Moire wavelength thereof is greater than 200 $\mu$m. To complete the light reflective polarizing screen of the present invention, a support sheet 7 made of soft poly(vinyl chloride) and having a thickness of 400 $\mu$m was applied to the PET sheet of the screen material and the resultant screen material was subsequently cut to a predetermined size. The resultant screen material cut to the predetermined size was then mounted on a known screen winding mechanism, thereby completing a reflection-type screen assembly for use in projecting the linearly polarized image.

Example 2

Except that the protective layer 5 of 5 $\mu$m in thickness, was formed by the use of a transparent paint of acrylic resin in place of the polyethylene film used in Example 1 and that a poly(methyl methacrylate) (PMMA) of 75 $\mu$m in thickness was employed in place of the PET sheet 3 used in Example 1 to form the metallic layer 4 thereon under the same condition as that used to deposit the aluminum layer 4, the reflection-type screen assembly for use in projecting the linearly polarized image was manufactured in the same manner as that in Example 1.

According to any one of the foregoing Examples 1 and 2, since the indentation structure necessary to control the angle of reflection (viewing angle) of the projected image is formed also on the polarizing film, any possible reduction in quality of the image projected onto the screen which would result from a reflection of the projected imagewise rays of light is advantageously minimized. The use of the polarizing film 6 prepared by the use of the EVOH transparent film and the dichroic organic dye makes it possible to manufacture a screen of large surface area as compared with the prior art screen employing the polarizing film prepared by the use of poly(vinyl alcohol) and iodine, and therefore, the screen assembly according to the present invention is advantageously suited for the presentation of a relatively large-size picture.

Also, since in the reflection-type screen according to the foregoing Examples 1 and 2 the flexible thermoplastic polymer sheet 3, the metallic layer 4 for reflecting rays of light, the flexible thermoplastic polarizing film 6 and the flexible protective layer 5 are laminated and are then backed up by the flexible support sheet 7, the reflection-type screen as a whole will become flexible enough to permit it to have a capability of bending that is generally required for the screen to be foldable or rolled up in a screen winding mechanism.

Furthermore, since the dichroic organic dye having a high heat resistance and humidity resistance is employed in place of the iodine compound generally used in the prior art, deterioration of both of the polarizability and the transmissivity of the polarizing film under the influence of ambient temperatures and ambient humidity can be minimized.

Also, since the use is made of an oxygen-impermeable poly(ethylene-co-vinyl alcohol) (EVOH) for forming the polarizing film 6 and/or the use is made of the protective layer 5 for covering the polarizing film 6, the reduction in reflectivity of the metal layer 4, which is attributable to an oxidization of the metal layer 4 in contact with air, can be advantageously minimized.

With the reflection-type screen according to the present invention, the linearly polarized imagewise rays of light emitted from the liquid crystal display device can be projected onto the screen to provide an image that can be viewed satisfactorily even under bright environments. Therefore, the reflection-type screen according to the present invention is particularly suited for use not only in home and factory workshop, but also in bidirectional video communication such as, for example, a television-aided conference and a television-aided telephone communication.

Figure 3:
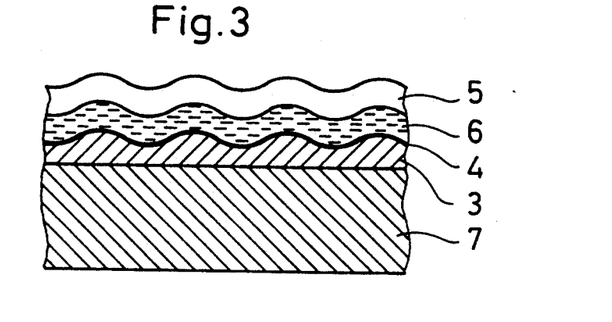
FIG. 3 is a schematic fragmentary sectional view of a screen of reflection type according to another preferred embodiment of the present invention.

Another example of the structure of the reflection-type screen capable of sharply displaying image formed by the linearly polarized imagewise rays of light projected from the liquid crystal display device onto the screen even under bright environments is shown in FIG. 3 for the purpose of illustration. A reflector sheet employed in this reflection-type screen is formed by vapor-depositing, or chemical plating, a metal having a high light reflectivity such as, for example, aluminum or silver, on one surface of a sheet 3 of thermoplastic polymer such as, for example, poly(ethylene terephthalate) (PET) to form a metallic layer 4 on the thermoplastic polymer sheet 3, subsequently forming a thermoplastic polymer sheet 3, subsequently forming a thermoplastic polarizing film 6 over the metallic layer 4 to form a composite sheet, and finally embossing the composite sheet to form an indentation structure thereon for the control of the viewing angle thereby manufacturing a screen. If desired, a surface of the screen adjacent the polarizing film 6 may be deposited with a protective film 5 while the opposite surface of the screen adjacent the thermoplastic polymer sheet 3 may be backed up by a support sheet 7.

Figure 4:
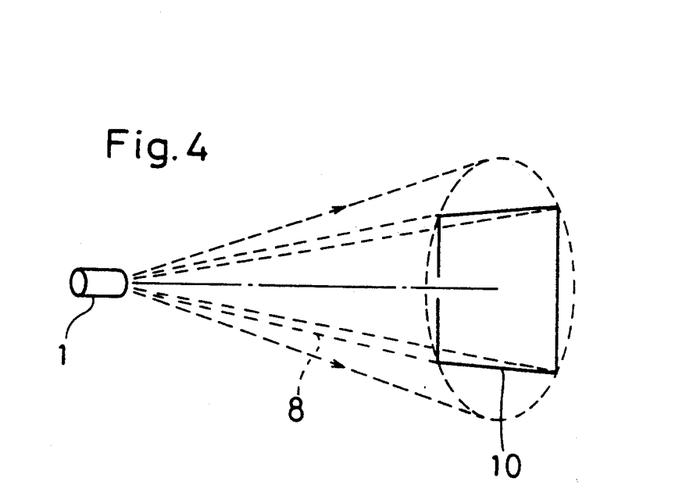
FIG. 4 is a schematic diagram showing the manner in which imagewise rays of light are projected from a liquid crystal display device towards the screen.

In order for the resultant screen to satisfy seemingly incompatible requirements associated with an increased visibility of the projected image and the capability of being folded or rolled up by the screen winding mechanism, respectively, it is desirable that the capability of the projected image on the screen being viewed while the screen is not curved should be enhanced. The imagewise rays of light 8 emitted from the liquid crystal display device are generally spherical waves and are, as shown in FIG. 4, projected onto the screen in a generally conical shape flaring outwardly from the liquid crystal display device 1 towards a standard plane 10 of the screen. When the image carried by the conical bundle of the spherical waves 8 projected from the liquid crystal display device 1 is desired to be presented on the screen at a high visibility, the provision of the indentation structure defined the following equations (1) to (7) on the reflector employed in the screen is an extremely effective means for reflecting the imagewise rays of light 8 uniformly from the screen towards a group of viewers encompassed by the angle of reflection (viewing angle). Therefore, a unique cross-sectional shape thereof will now be discussed.

Figure 5:
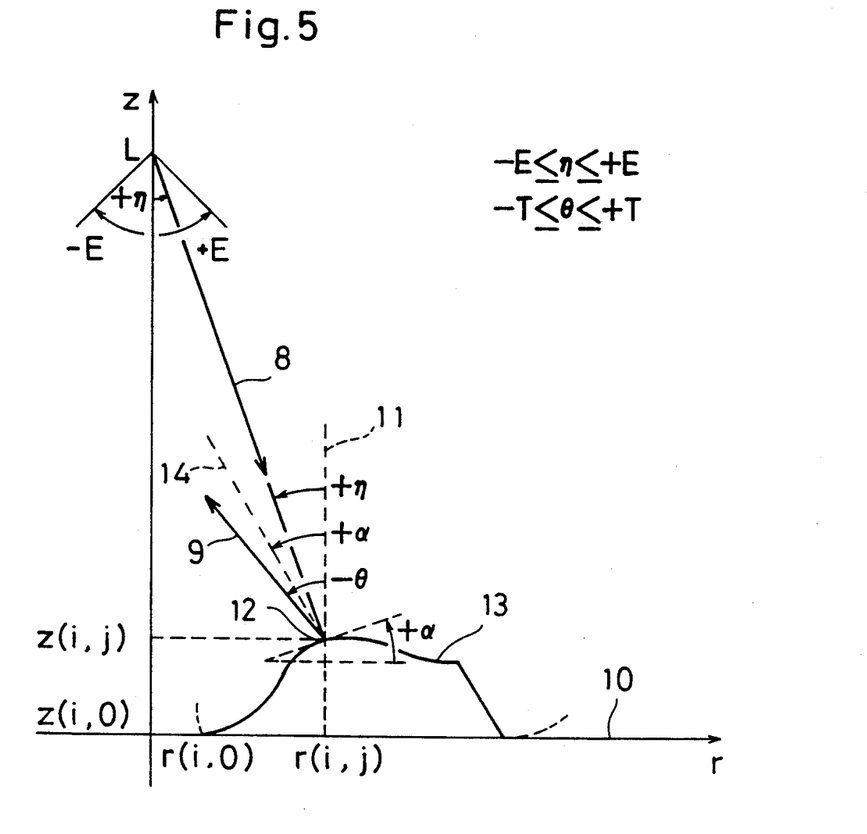
FIG. 5 is a diagram showing the projected imagewise rays of light from the liquid crystal display device which are divided into minute projecting areas.

As shown in FIG. 5, the screen is disposed with a surface thereof oriented perpendicular to a center axis of a bundle of imagewise rays of light 8 projected from a projector in the form of a cone of light as spherical waves onto the screen for presentation of an image carried by the imagewise rays of light. This screen includes a reflecting surface 12 of a shape defined by the following equations (1) to (7), in which the origin of coordinates is represented by a center of a standard plane 10 of the screen and the systems of coordinates in a direction towards the standard plane 10 and in a direction 11 normal to the standard plane 10 are expressed by r and z, respectively:

$$r(i,j) = \{L + (i,j-1)\tan\alpha(i,j) + \quad (1)$$
$$z(i,j-1)\}\tan\eta(i,j)/\{1 + \tan\alpha(i,j)\tan\eta(i,j)\}$$

$$r(i,0) = L\tan\eta(i,0) \quad (2)$$

$$z(i,j) = \{r(i,j) - r(i,j-1)\}\tan\alpha(i,j) + z(i,j-1) \quad (3)$$

$$z(i,0) = 0 \quad (4)$$

$$\alpha(i,j) = \{\eta(i,j) - \theta(i,j)\}/2 \quad (5)$$

$$\eta(i,j) = (E/m)\{i + j/(4n)\}(0 \leq i \leq m-1, 0 \leq j \leq 4n) \quad (6)$$

$$\theta(j) = \begin{cases} -T(j/n) & (0 \leq j \leq n) \\ T\{j/(n-2)\} & (n \leq j \leq 3n) \\ T\{4-(j/n)\} & (3n \leq j \leq 4n) \end{cases} \quad (7)$$

In these equations (1) to (7):
L represents the distance from the projector to the standard plane 10 of the screen;
E represents half the maximum angle of projection; and
T represents half the maximum angle of reflection;
 wherein a structure of the section passing through the origin of coordinates is prepared by dividing the value E into m equal components (i representing an i-th projecting area from the center axis of the cone of the projected imagewise rays of light 8) and, also, the value T into n equal components (j representing a j-th unitary reflecting area from a standard reflecting plane in a reflecting region 13 corresponding to each projecting area);
wherein;
α(i, j) represents the angle of inclination of the unitary reflecting area, operable to reflect the (i×j)-th component of the projected imagewise rays of light 8, relative to the r-axis;

η(i, j) represents the angle of projection of the (i×j)-th component of the projected imagewise rays of light 8; and θ(j) represents the angle of reflection (the angle of inclination relative to the normal 11 to the standard plane 10 of the screen) of the j-th component of the reflected rays of light 9 in each reflecting area; and wherein each of the parameters E and η takes a positive value in a counterclockwise direction with respect to the angle in a direction 11 normal to the standard plane 10 of the screen which is represented by zero (0); each of the parameters T and θ takes a positive value in a clockwise direction with respect to the angle in a direction 11 normal to the standard plane 10 of the screen which is represented by zero (0); and the parameter α takes a positive value in a counterclockwise direction with respect to the angle in a direction 11 normal to the standard plane 10 of the screen which is represented by zero (0).

Figure 6:
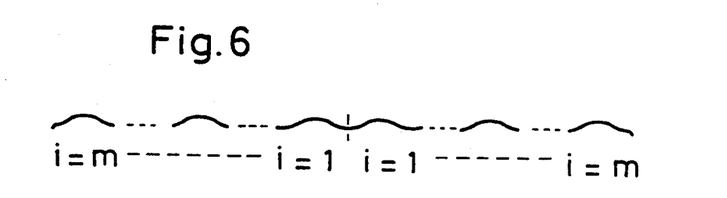
FIG. 6 is a diagram showing reflecting areas coupled on a standard plane of the screen.

The manner by which the screen is manufactured will now be described. The half value E (E>0) of the angle of projection of the imagewise rays of light 8 from the liquid crystal display device towards the screen is equally divided into m angle components so that the cone of the imagewise rays of light 8 travelling from the liquid crystal display device towards the screen is divided into m projecting regions, each of said m projecting regions being equally divided into 4n to define 4n unitary components of the cone of the projected imagewise rays of light 8. On the other hand, the half value T (T>0) of the viewing angle (i.e., the half value of the angle of projection) viewed from the reflector of the screen towards the position of viewers (occupying adjacent the position of installation of the liquid crystal display device) is equally divided into n angle components, and also, as shown in FIG. 6, m reflecting regions 13 each comprised of 4n unitary reflecting areas for each projecting region are coupled at the standard plane 10 of the screen thereby to form a reflecting surface 12 spreading outwardly from the center of the standard plane 10 of the screen.

So far as the j-th unitary reflecting surface in the i-th reflecting region 13 counted from the center of the standard plane 10 of the screen is concerned, the angle of inclination α(i, j) of the reflecting surface 12 relative to the direction of the standard plane 10 (containing an axis r) and the angle of projection η(i, j) are expressed by the previously mentioned equations (5) and (6), respectively. When the angle of reflection θ at the reflecting surface 12 is defined by the previously mentioned equation (7), θ(0)=θ(2n)=θ(4n)=0, θ(3n)=−T, and θ(3n)=T, and hence, as the value j increases progressively from 0 to 4n for each reflecting region 13, the projected imagewise rays of light 8 are reflected twice at each of the 4n angles of reflection ranging from −T to T. An increase of the value m makes the reflecting regions 13 dense while an increase of the value n results in a fine division of the angle of reflection at each reflecting regions, and therefore, an increase of both of the values m and n results in an increase of the resolution of the image.

Accordingly, each of the values m and n is preferably so chosen as to be as greater a value as possible under limited conditions imposed by the distance L from the liquid crystal display device to the screen, the half projection angle E, the half viewing angle T and/or the accuracy to which an embossing dies is machined, thereby rendering each reflecting region 13 to have a width smaller than the width of the image projected through each liquid crystal picture element.

The previously mentioned equations (1) to (7) are effective to define a cross-sectional shape which is symmetrical with respect to the normal 11 to the standard plane 10 of the screen and passing through the center thereof, and can be used for the adjustment in all directions of the viewing angle exhibited by the indentation structure, comprising a group of concentric circles, formed in a radial direction on the standard plane 10 installed perpendicular to the center axis of the cone of the projected imagewise rays of light 8, for the adjustment of the viewing angle only in a horizontal direction exhibited by the indentation structure formed in the horizontal direction, for the adjustment of the viewing angle only in a vertical direction exhibited by the indentation structure formed in the vertical direction, and/or for a modification or a combination of these adjustments by the use of modified or combined indentation structures. The indentation structure for the adjustment of the viewing angle can be formed on an embossing dies by the use of a computer-controlled cutting machine and can then be transcribed onto the reflector of the screen when such embossing dye is used during the embossing process subjected to the screen.

EXAMPLE 3

In order for the image projected onto the screen, spaced a distance L of 298.564 cm from the projector, at a half angle of projection E of 15 degrees and on an enlarged scale of 200 cm (79.7 inches) in diagonal length and of 160 cm and 120 cm in width and height, respectively, to be viewable at a half angle T of horizontal reflection (i.e., horizontal half viewing angle) of 60 degrees, the reflection-type screen was prepared in the following manner.

In the first place, under a condition in which the number of the reflecting regions 2m was chosen to be 1,600 and the number of directions n of horizontal reflection was chosen to be 600, the cross-sectional shape of the corrugated reflector having an indentation structure in a horizontal direction of the screen was designed using the previously mentioned equations (1) to (7). Then, with the use of a computer-controlled cutting machine equipped with a series of bites so designed and so arranged as to form the cross-sectional profiles of the reflecting regions, a pattern complementary to the cross-sectional shape of the indentation structure was formed onto a surface of a rolling dies made of brass.

Figure 7:
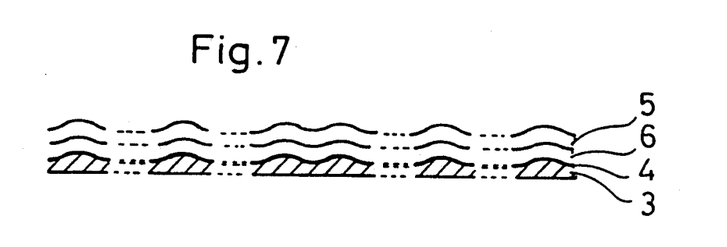
FIG. 7 is a schematic fragmentary sectional view of screen material.

In the same manner as that of Example 1, a light reflecting sheet is prepared and using the rolling dies, the light reflecting sheet was embossed at 125° C. from one side thereof adjacent the protective film 5, thereby providing the screen material of a structure shown in FIG. 7.

Figure 8:
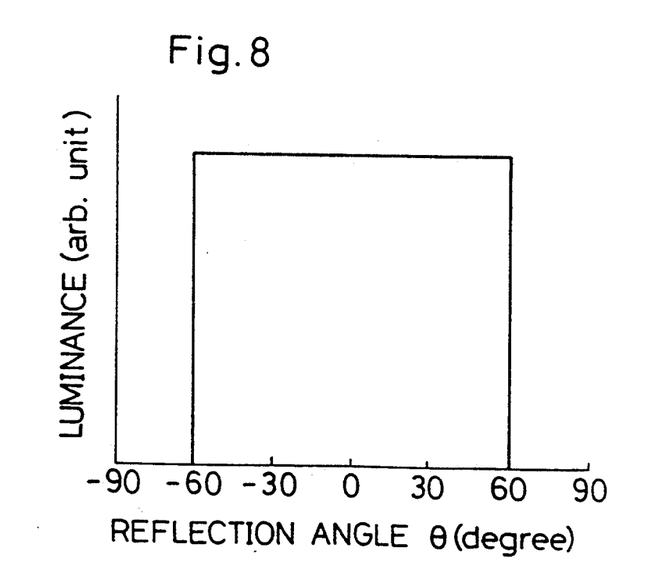
FIG. 8 is a graph showing a characteristic of the reflection-type screen associated with the reflection of the image presented on the screen.

After a support sheet 7 made of soft poly(vinyl chloride) and having a thickness of 400 μm had subsequently been applied to one surface of the screen material adjacent the poly(ethylene terephthalate) sheet 3 as shown in FIG. 3, the screen material was mounted with a screen winding mechanism thereby completing the screen of reflection-type having such a uniform image reflecting characteristic as shown in FIG. 8.

According to the foregoing Example 3, by allowing the screen to reflect the projected imagewise rays of light 8 of spherical waves uniformly at a desired viewing angle (angle of reflection), the cross-sectional shape effective to maximize the viewing of the projected image can be imparted to the reflector of the screen and, therefore, the image projected onto the screen can advantageously viewed clearly. Therefore, in the practice of the present invention, where the light absorbable polarizing film 6 is disposed on the surface of the reflector, and if the polarizing film 6 and the direction of vibration of electromagnetic waves are properly adjusted to maximize the transmission of the linearly polarized rays of light through the polarizing film 6, the image projected from the liquid crystal display device onto the screen can be viewed under bright environments. Consequently, the screen of reflection-type according to Example 3 is particularly suited for use not only in home and factory workshop, but also in bidirectional video communication such as, for example, a television-aided conference and a television-aided telephone communication.

Figure 9:
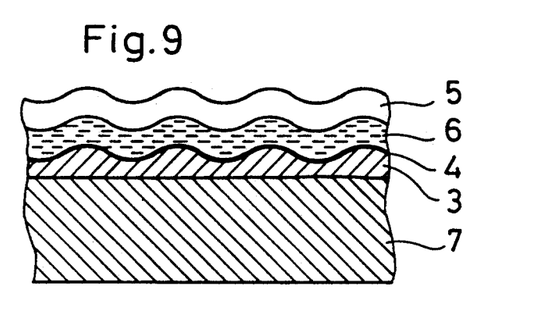
FIG. 9 is a schematic fragmentary sectional view of the screen of reflection type according to a further preferred embodiment of the present invention.

FIG. 9 illustrates another structure of the screen of reflection-type designed to present, even under bright environments, a clear image formed by the linearly polarized imagewise rays of light projected from the liquid crystal display device onto the screen. A reflector employed in this reflection-type screen is formed by vapor-depositing, or chemical plating, a metal having a high light reflectivity such as, for example, aluminum or silver, on one surface of a sheet 3 of thermoplastic polymer such as, for example, poly(ethylene terephthalate) (PET) to form a metal layer 4 on the thermoplastic polymer sheet 3, subsequently forming a thermoplastic polarizing film 6 over the metal layer 4 to form a composite sheet, and finally embossing the composite sheet to form an indentation structure thereon for the control of the viewing angle thereby manufacturing the screen.

Figure 10:
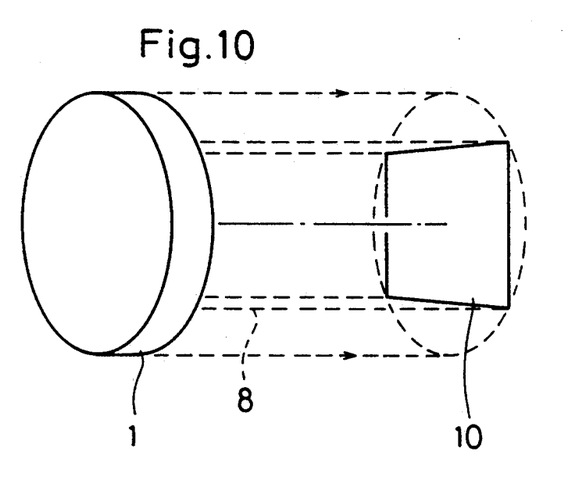
FIG. 10 is a schematic diagram showing the manner in which imagewise rays of light are projected from a liquid crystal display device towards the screen.

In order for the resultant screen to satisfy both the requirement of an increased visibility of the projected image and the requirement of the capability of being folded or rolled up by the screen winding mechanism, it is desirable that the capability of the projected image on the screen being viewed while the screen is not curved should be enhanced. While the imagewise rays of light 8 projected from the liquid crystal display device are generally spherical waves and are projected on an enlarged scale onto the screen in a generally conical shape flaring outwardly from the liquid crystal display device 1 towards a standard plane 10 of the screen, the imagewise rays of light 8 projected from the liquid crystal display device may be deemed as plane waves projected in a direction perpendicular to the standard plane 10 of the screen as shown in FIG. 10 if the magnification at which they are projected is relatively small.

When the image carried by the plane waves of projected light is desired to be presented on the screen at a high visibility, the provision of the indentation structure defined by the following equations (11) to (14) on the reflector employed in the screen is an extremely effective means for reflecting the imagewise rays of light 8 uniformly from the screen towards a group of viewers encompassed by the angle of reflection (viewing angle). Therefore, a unique cross-sectional shape thereof will now be discussed.

Figure 11:
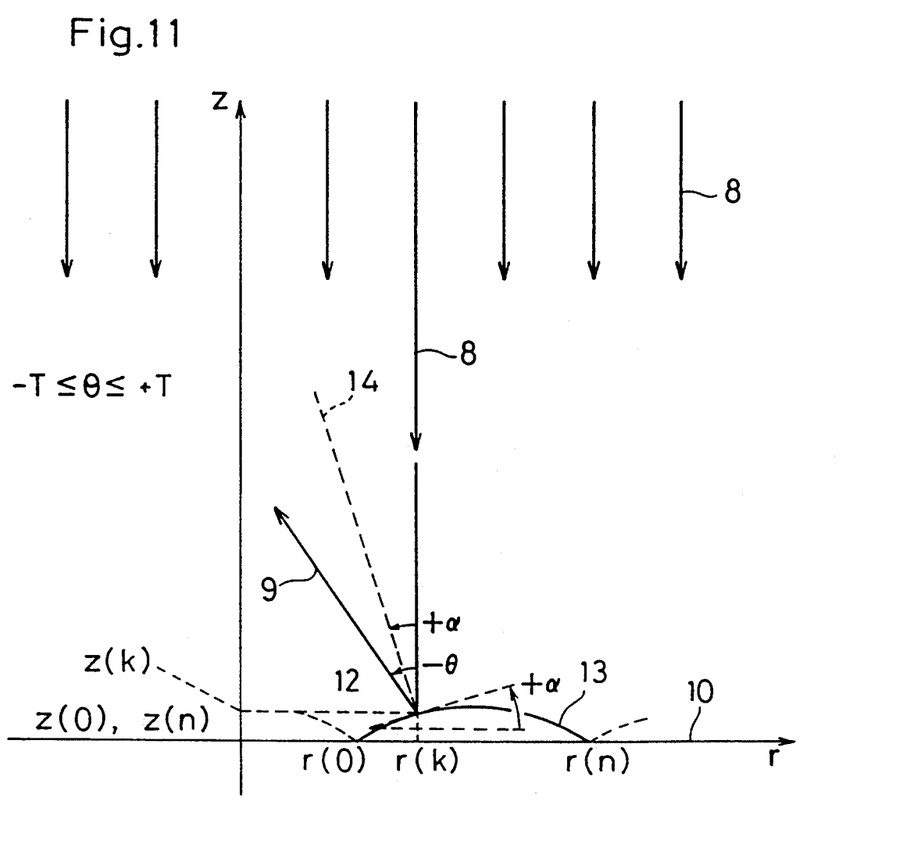
FIG. 11 is a diagram showing the reflected imagewise rays of light from the screen which are divided into n equal reflecting regions.

As shown in FIG. 11, the screen is disposed with a surface thereof oriented perpendicular to a center axis of a bundle of imagewise rays of light 8 projected from a projector as plane or approximately plane waves onto the screen for presentation of an image carried by the imagewise rays of light 8, said screen having a reflecting surface 12, a unitary structure of a periodic cross-sectional shape of said reflecting surface 12 being defined by r coordinates given by the following equation (11) and z coordinates given by any one of the following equations (12) to (14) when the systems of coordinates in a direction towards a standard plane 10 of the screen and in a direction 11 normal to the standard plane are expressed by r and z, respectively:

$$r(j) = \frac{j}{n} \times \xi \quad (11)$$

$$z(j) = \begin{cases} \frac{\xi}{n} \sum_{k=1}^{j} \tan[\{(n-k+1)/n\} \cdot (t/2)] & (0 \leq j \leq n) \\ \zeta - \frac{\xi}{n} \sum_{k=1}^{j} \tan\{(k/n) \cdot (T/2)\} & (n \leq j \leq 2n) \end{cases} \quad (12)$$

$$z(j) = \quad (13)$$

$$\begin{cases} \zeta - \frac{\xi}{n} \sum_{k=1}^{j} \tan[\{(n-k+1)/n\} \cdot (T/2)] & (0 \leq j \leq n) \\ \frac{\xi}{n} \sum_{k=1}^{j} \tan\{(k/n) \cdot (T/2)\} & (n \leq j \leq 2n) \end{cases}$$

$$z(j) = \quad (14)$$

$$\begin{cases} \frac{\xi}{n} \sum_{k=1}^{j} \tan\{(k/n) \cdot (T/2)\} & (0 \leq j \leq n) \\ \zeta + \frac{\xi}{n} \sum_{k=1}^{j} \tan[\{(n-k+1)/n\} \cdot (T/2)] & (n \leq j \leq 2n) \\ 2\zeta - \frac{\xi}{n} \sum_{k=1}^{j} \tan\{(k/n) \cdot (T/2)\} & (2n \leq j \leq 3n) \\ \zeta - \frac{\xi}{n} \sum_{k=1}^{j} \tan[\{(n-k+1)/n\} \cdot (T/2)] & (3n \leq j \leq 4n) \end{cases}$$

In these equations (11) to (14), T represents half the maximum angle of reflection and takes a positive value in a clockwise direction with respect to the angle in a direction 11 normal to the standard plane 10 of the screen which is represented by zero (0). The equation (12) and (13) gives rise to a sectional shape of a cycle 2ξ and the equation (14) gives rise to a sectional shape of a cycle 4ξ, when the parameter T is divided into n equal components (j representing a j-th unitary reflecting area from a standard reflecting plane 10 in each unitary structure of the reflecting surface). The parameter ζ is given by the following equation (15):

$$\zeta = \left| \frac{\xi}{n} \sum_{k=1}^{n} \tan\{(k/n) \cdot (T/n)\} \right| \quad (15)$$

Figure 12:
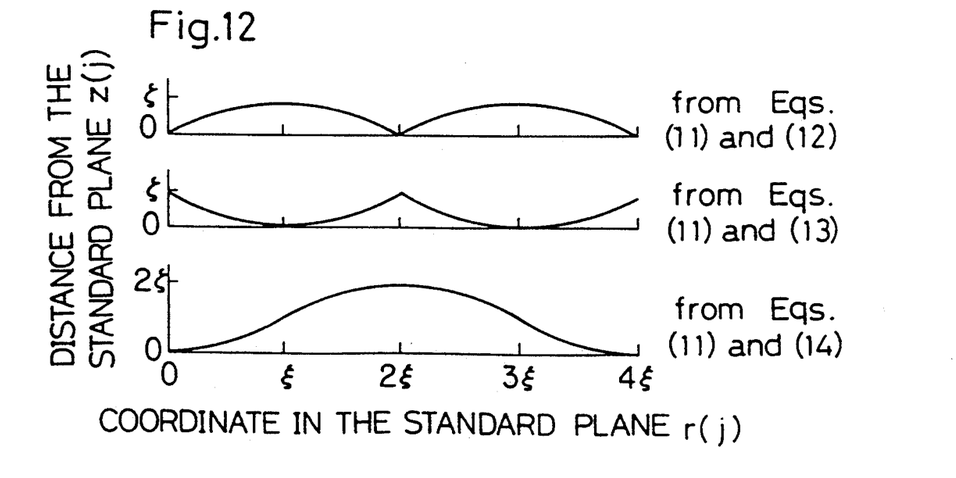
FIG. 12 is a fragmentary sectional view showing the sectional shape of the screen of reflection type shown in FIG. 9.

The manner by which the screen is manufactured will now be described. The half value T (T>0) of the angle of reflection of the imagewise rays of light from the reflector of the screen towards the position of viewers is equally divided into n angle components to define a reflecting region 13 comprising n unitary reflecting surfaces which are coupled at the standard plane 10 of the screen thereby to form a reflecting surface 12 having a periodic cross-sectional shape. In each of the reflecting regions 13, the system of coordinates in the direction of the standard plane 10 (r-axis) is expressed by the previously mentioned equation (11) while the system of coordinates in the direction 11 (z-axis) normal to the standard plane 10 is expressed by any one the previously mentioned equations (12), (13) and (14). The cross-sectional shape represents a convex surface mirror having a cycle of 2ξ if the previously mentioned equations (11) and (12) are used, a concave surface mirror having a cycle of 2ξ if the previously mentioned equations (11) and (13) are used, and an alternately convexed and concaved surface mirror having a cycle of 4ξ if the previously mentioned equations (11) and (14) are used, as shown in FIG. 12. As the value ξ becomes smaller, the reflecting region 13 becomes dense, and as the value n increases, the angle of reflection at each reflecting region 13 are divided into minute values.

Accordingly, by choosing the value ξ as small as possible and the value n as great as possible under limited conditions imposed by the half viewing angle and/or the accuracy to which an embossing dies is machined, it is preferred to increase the resolution of the projected image and to reduce the width of each reflecting region 13 to have a width smaller than the width of the image projected through each liquid crystal picture element. The previously mentioned equations (11) to (14) are effective to define a periodic cross-sectional shape passing through the center of the standard plane 10, and can be used for the adjustment in all directions of the viewing angle exhibited by the indentation structure, comprising a group of concentric circles, formed in a radial direction on the standard plane 10 installed perpendicular to the center axis of the projected imagewise rays of light 8, for the adjustment of the viewing angle only in a horizontal direction exhibited by the indentation structure formed in the horizontal direction, and/or for a modification or a combination of these adjustments by the use of modified or combined indentation structures. The indentation structure for the adjustment of the viewing angle can be formed on an embossing dies by the use of a computer-controlled cutting machine and can then be transcribed onto the reflector of the screen when such embossing dye is used during the embossing process subjected to the screen.

EXAMPLE 4

In order for the image projected onto the screen in a state of plane waves or approximately plane waves from the projector to be viewable at a half angle T of horizontal reflection (i.e., horizontal half viewing angle) of 30 degrees, the reflection-type screen was prepared in the following manner.

In the first place, under a condition in which the cycle 4ξ of the reflecting regions 13 was chosen to be 800 and the number of horizontal reflecting directions n was chosen to be 300, the cross-sectional shape of the corrugated reflector having an indentation structure in a horizontal direction of the screen was designed using the previously mentioned equations (11) and (14). Then, with the use of a computer-controlled cutting machine equipped with a series of bites so designed and so arranged as to form the cross-sectional profiles of the reflecting regions 13, a pattern complemental to the cross-sectional shape of the indentation structure was formed onto a surface of a rolling dies made of brass.

Figure 13:
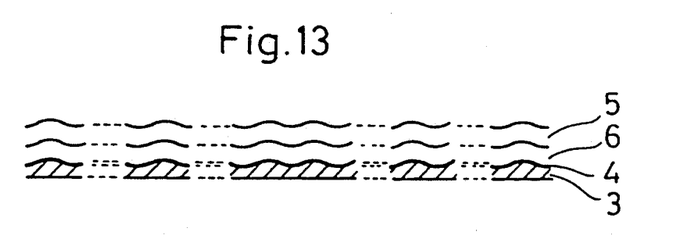
FIG. 13 is a schematic fragmentary sectional view showing screen material.

In the same manner as that of Example 1, a light reflecting sheet is prepared and using the rolling dies, the light reflecting sheet was embossed at 125° C. from one side thereof adjacent the protective film 5, thereby providing the screen material of a structure shown in FIG. 13.

Figure 14:
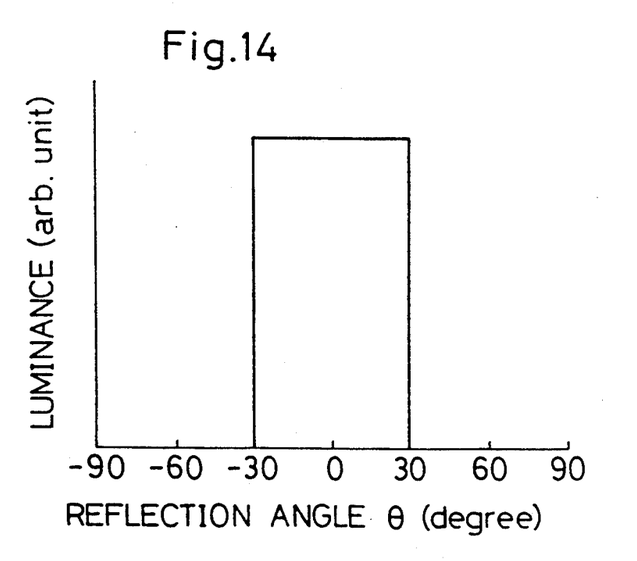
FIG. 14 is a graph showing a characteristic of the reflection-type screen associated with the reflection of the image presented on the screen.

After a support sheet 7 made of poly (vinyl chloride) and having a thickness of 400 μm had subsequently been applied to one surface of the screen material adjacent the poly(ethylene terephthalate) sheet 3 as shown in FIG. 9, the screen material was mounted with a screen winding mechanism thereby completing the screen of reflection-type having such a uniform image reflecting characteristic as shown in FIG. 14.

According to the foregoing Example 4, by allowing the screen to reflect the projected imagewise rays of light 8 of plane, or generally plane, waves uniformly at a desired viewing angle (angle of reflection), the cross-sectional shape effective to maximize the viewing of the projected image can be imparted to the reflector of the screen and, therefore, the image projected onto the screen can advantageously viewed clearly. Therefore, in the practice of the present invention, where the light absorbable polarizing film 6 is disposed on the surface of the reflector, and if the polarizing film 6 and the direction of vibration of electromagnetic waves are properly adjusted to maximize the transmission of the linearly polarized rays of light 8 through the polarizing film 6, the image projected from the liquid crystal display device onto the screen can be viewed under bright environments. Consequently, the screen of reflection-type according to Example 4 is particularly suited for use not only in home and factory workshop, but also in bidirectional video communication such as, for example, a television-aided conference and a television-aided telephone communication Although the present invention has been fully described by way of the various illustrative examples with reference to the accompanying drawings which are taken only for facilitating a better understanding of the present invention, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A screen of reflection-type operable with linearly polarized imagewise rays of light projected thereon for presenting a projected image, carried by the linearly polarized imagewise rays of light, to viewers occupying a position in front of the screen, said screen comprising:
    a polarizing film having first and second surfaces, said linearly polarized imagewise rays of light being incident upon the first surface thereof while the linearly polarized imagewise rays of light have a plane of vibration of an electric field or a magnetic field in a direction required to exhibit a maximum light transmissivity;
    a metal layer formed on the second surface of the polarizing film for reflecting the linearly polarized imagewise rays of light; and
    an indentation structure formed on both of the metal layer and the polarizing film for reflecting the imagewise rays of light uniformly at a desired angle of reflection.

2. The screen of reflection-type as claimed in claim 1, wherein said screen is adapted to be disposed with a surface thereof oriented perpendicular to a center axis of a bundle of imagewise rays of light projected from a projector in the form of a cone of light as spherical waves onto the screen for presentation of an image carried by the imagewise rays of light, said screen having a reflecting surface of a shape defined by the following equations (1) to (7) in which the origin of coordinates is represented by a center of a standard plane of the screen and the systems of coordinates in a direction towards the standard plane and in a direction normal to the standard plane are expressed by r and z, respectively:

$$r(i, j) = \{L + (i, j - 1)\tan\alpha(i, j) + z(i, j - 1)\}\tan\eta(i, j)/\{1 + \tan\alpha(i, j)\tan\eta(i, j)\} \quad (1)$$

$$r(i, 0) = L\tan\eta(i, 0) \quad (2)$$

$$z(i, j) = \{r(i, j) - r(i, j - 1)\}\tan\alpha(i, j) + z(i, j - 1) \quad (3)$$

$$z(i, 0) = 0 \quad (4)$$

$$\alpha(i, j) = \{\eta(i, j) - \theta(i, j)\}/2 \quad (5)$$

$$\eta(i, j) = (E/m)\{i + j/(4n)\}(0 \leq i \leq m - 1, 0 \leq j \leq 4n) \quad (6)$$

$$\theta(j) = \begin{cases} -T(j/n) & (0 \leq j \leq n) \\ T\{j/(n-2)\} & (n \leq j \leq 3n) \\ T\{4 - (j/n)\} & (3n \leq j \leq 4n) \end{cases} \quad (7)$$

wherein;

L represents the distance from the projector to the standard plane of the screen;

E represents half the maximum angle of projection; and

T represents half the maximum angle of reflection; wherein a structure of the section passing through the origin of coordinates is prepared by dividing the value E into m equal components (i representing an i-th projecting area from the center axis of the cone of the projected imagewise rays of light) and, also, the value T into n equal components (j representing a j-th unitary reflecting area from a standard reflecting plane in a reflecting region corresponding to each projecting area); wherein;

$\alpha(i, j)$ represents the angle of inclination of the unitary reflecting area, operable to reflect the (i×j)-th component of the projected imagewise rays of light, relative to the r-axis;

$\eta(i, j)$ represents the angle of projection of the (i×j)-th component of the projected imagewise rays of light; and $\theta(j)$ represents the angle of reflection (the angle of inclination relative to the normal to the standard plane of the screen) of the j-th component of the reflected rays of light in each reflecting area; and wherein each of the parameters E and $\eta$ takes a positive value in a counterclockwise direction with respect to the angle in a direction normal to the standard plane of the screen which is represented by zero (0); each of the parameters T and $\theta$ takes a positive value in a clockwise direction with respect to the angle in a direction normal to the standard plane of the screen which is represented by zero (0); and the parameter $\alpha$ takes a positive value in a counterclockwise direction with respect to the angle in a direction normal to the standard plane of the screen which is represented by zero (0).

3. The screen of reflection-type as claimed in claim 1, wherein said screen is adapted to be disposed with a surface thereof oriented perpendicular to a center axis of a bundle of imagewise rays of light projected from a projector as plane or approximately plane waves onto the screen for presentation of an image carried by the imagewise rays of light, said screen having a reflecting surface, a unitary structure of a periodic cross-sectional shape of said reflecting surface being defined by r coordinates given by the following equation (11) and z coordinates given by any one of the following equations (12) to (14) when the systems of coordinates in a direction towards a standard plane of the screen and in a direction normal to the standard plane are expressed by r and z, respectively:

$$r(j) = \frac{j}{n} \times \xi \quad (11)$$

$$z(j) = \begin{cases} \frac{\xi}{n} \sum_{k=1}^{j} \tan[\{(n - k + 1)/n\} \cdot (T/2)] & (0 \leq j \leq n) \\ \zeta - \frac{\xi}{n} \sum_{k=1}^{j} \tan\{(k/n) \cdot (T/2)\} & (n \leq j \leq 2n) \end{cases} \quad (12)$$

$$z(j) = \begin{cases} \zeta - \frac{\xi}{n} \sum_{k=1}^{j} \tan[\{(n - k + 1)/n\} \cdot (T/2)] & (0 \leq j \leq n) \\ \frac{\xi}{n} \sum_{k=1}^{j} \tan\{(k/n) \cdot (T/2)\} & (n \leq j \leq 2n) \end{cases} \quad (13)$$

$$z(j) = \begin{cases} \frac{\xi}{n} \sum_{k=1}^{j} \tan\{(k/n) \cdot (T/2)\} & (0 \leq j \leq n) \\ \zeta + \frac{\xi}{n} \sum_{k=1}^{j} \tan[\{(n - k + 1)/n\} \cdot (T/2)] & (n \leq j \leq 2n) \\ 2\zeta - \frac{\xi}{n} \sum_{k=1}^{j} \tan\{(k/n) \cdot (T/2)\} & (2n \leq j \leq 3n) \\ \zeta - \frac{\xi}{n} \sum_{k=1}^{j} \tan[\{(n - k + 1)/n\} \cdot (T/2)] & (3n \leq j \leq 4n) \end{cases} \quad (14)$$

wherein T represents half the maximum angle of reflection and takes a positive value in a clockwise direction with respect to the angle in a direction normal to the standard plane of the screen which is represented by zero (0);

wherein the equation (12) and (13) gives rise to a sectional shape of a cycle $2\xi$ and the equation (14) gives rise to a sectional shape of a cycle $4\xi$, when the parameter T is divided into n equal components (j representing a j-th unitary reflecting area from a standard reflecting plane in each unitary structure of the reflecting surface);

wherein the parameter $\zeta$ is given by the following equation (15):

$$\zeta = \left| \frac{\xi}{n} \sum_{k=1}^{n} \tan\{(k/n) \cdot (T/n)\} \right| \quad (15)$$

4. The screen of reflection type as claimed in claim 1, wherein said polarizing film is prepared in the form of a thermoplastic polymer film containing a dichroic organic dye.

5. The screen of reflection type as claimed in claim 1, wherein said polarizing film is prepared in the form of an oxygen-impermeable polymer film containing a dichroic organic dye.

6. The screen of reflection type as claimed in claim 1, wherein the polarizing film has a surface covered by a transparent protective layer along the indentation structure of the polarizing film.

7. The screen of reflection type as claimed in claim 1, wherein the metal layer is formed on a thermoplastic polymer sheet.

8. The screen of reflection-type as claimed in claim 5, wherein said polarizing film is made of ethylene-vinyl alcohol copolymer containing dichroic organic dyes.

9. The screen of reflection type as claimed in claim 6, wherein said protective layer is made of one of polyethylene film and a transparent paint containing acrylic resin.

10. The screen of reflection type as claimed in claim 7, wherein said thermoplastic polymer sheet is made of one of poly(ethylene terephthalate) and poly(methyl methacrylate).

* * * * *